(12) United States Patent
Shahid (10) Patent No.: US 6,263,132 B1
(45) Date of Patent: Jul. 17, 2001

(54) APPARATUS AND METHOD FOR LATERALLY DISPLACING AN OPTICAL SIGNAL

(75) Inventor: Muhammed Afzal Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,489

(22) Filed: Aug. 25, 1999

(51) Int. Cl.$^7$ .................................................. G02B 6/42
(52) U.S. Cl. ................................. 385/31; 385/33; 385/36
(58) Field of Search ................................. 385/16, 18, 19, 385/24, 31, 33, 34, 36

(56) References Cited

U.S. PATENT DOCUMENTS

| 4,626,065 | * | 12/1986 | Mori | 350/96.15 |
| 4,961,627 | | 10/1990 | Swain et al. | 350/319 |
| 5,066,090 | | 11/1991 | Mayerhofer et al. | 385/35 |
| 5,071,216 | * | 12/1991 | Sullivan | 385/34 |
| 5,073,003 | | 12/1991 | Clark | 385/33 |
| 5,093,879 | | 3/1992 | Bregman et al. | 385/93 |
| 5,357,590 | | 10/1994 | Auracher | 385/33 |
| 5,600,741 | | 2/1997 | Hauer et al. | 385/35 |
| 6,009,219 | * | 12/1999 | Doyle | 385/23 |

\* cited by examiner

Primary Examiner—John D. Lee
Assistant Examiner—Jennifer Doan
(74) Attorney, Agent, or Firm—John M. Harman

(57) ABSTRACT

Embodiments of the invention include an optical communications system including an apparatus and method for laterally displacing or otherwise steering optical signals passing therethrough. The system comprises a launching device for launching or transmitting an optical signal, a receiving device for receiving an optical signal, and at least one optical guiding element. The optical guiding element is a transmission medium that captures and transmits optical information therethrough and is configured, e.g., via end geometries, to redirect a portion of light propagating in a first direction and entering the first end substantially along its transmission axis and to redirect light propagating along the transmission axis out of the second end in a desired direction, e.g., a second direction laterally displaced from the first direction. Embodiments include angled faces with or without reflective coatings and attached lenses opposing the angled faces. A pair of optical guiding elements is used to laterally displace a launched signal path and a receiving signal path in such a way that the distance between the transmission axes of the launched and received signal paths is increased or decreased, depending on the arrangement. Other embodiments of the invention include optical information splitting arrangements and optical information multiplexing arrangements using a plurality of optical guiding elements coupled between one or more optical signal launching elements and one or more optical receiving devices.

17 Claims, 5 Drawing Sheets

APPARATUS AND METHOD FOR LATERALLY DISPLACING AN OPTICAL SIGNAL

BACKGROUND OF THE INVENTION

1. Field of the Invention

The invention relates to optical signal transmission. More particularly, the invention relates to an apparatus and method for steering or redirecting light beams within optical communications systems.

2. Description of the Related Art

Redirecting or steering an optical signal or beam within an optical communications system is accomplished by many conventional devices and for many different reasons. Often, optical signals are redirected to better align them with one or more components within the system. For example, optical signals often are redirected to better align with a detector or receiver after having passed through various system components. Also, because optical sources such as an edge or surface emitting laser or a light emitting diode (LED) and optical detectors such as semiconductor photodetectors and photodiodes often are oriented differently with respect to the path of light travel into or out of the particular device or package, optical beams often must be redirected for better alignment therewith.

Also, in many optical communications systems, optical sources and detectors are packaged together as part of a transceiver or as part of multiple source/detector arrangements. In a typical transceiver configuration, the optical source and its corresponding detector often are side by side, with the distance between respective central axes thereof on the order of 5 millimeters (mm). In a typical optical communications system arrangement, at least a portion of an optical signal transmitted from an optical source of a first transceiver is transported to various system components including an optical receiver or detector from, e.g., a second transceiver, while another optical signal is transported from a source of the second transceiver to, e.g., the optical receiver/detector of the first transceiver.

Conventional beam steering devices include devices that actively change the direction of transmitted or reflected beams using, e.g., movable lens or mirror arrangements. Such active beam steering devices include, e.g., U.S. Pat. Nos. 4,961,627 and 5,600,741. However, active beam steering devices often are relatively expensive and bulky, as they typically require some mechanical means for providing translational or rotational motion to the lenses, mirrors and/or prisms. Such devices typically are geared toward applications that require relatively precise alignment tolerances.

Conventional beam steering devices also include passive devices, such as substrates with grooves and reflective surfaces formed therein for aligning, e.g., optical fibers and other waveguide structures for steering beams. See, e.g., U.S. Pat. No. 5,073,003, which is assigned to the assignee of this application, and U.S. Pat. No. 5,600,741.

Although many conventional devices and techniques exist for actively and passively steering beams of optical signal through optical communications systems, it is desirable to have available a relatively simple, efficient and inexpensive apparatus and method for passively redirecting optical beams. Also, it is desirable to have available a passive beam steering device with the flexibility to be useful in many different beam steering applications.

SUMMARY OF THE INVENTION

The invention is embodied in an optical communications system including an apparatus and method for laterally displacing or otherwise steering optical signals passing therethrough. The system comprises a launching device for launching or transmitting an optical signal, a receiving device for receiving an optical signal, and at least one optical guiding element. The optical guiding element is a transmission medium that captures and transmits optical information therethrough and is configured, e.g., via end geometries, to redirect a portion of light propagating in a first direction and entering the first end substantially along its transmission axis and to redirect light propagating along the transmission axis out of the second end in a desired direction, e.g., a second direction laterally displaced from the first direction. For example, the ends of the optical guiding element are angled faces with or without a reflective coating formed thereon. Also, e.g., lenses are coupled to the ends opposite the angled faces. For endfaces angled at approximately 45 degrees, the transmission axis of the optical beam entering the optical guiding element and the optical beam exiting the optical guiding element are substantially parallel.

In one embodiment, the transmission axis of an optical beam coupled to the first end of an optical guiding element is laterally displaced to an optical element, e.g., an optical fiber, coupled to the second end of the optical guiding element. Alternatively, a pair of optical guiding elements aligned substantially coaxial and coupled at their first ends to an optical element, e.g., an optical source, work to increase the distance between the transmission axes of the launched and received optical signals. Such beam steering is advantageous, e.g., in aligning beams launched into and out of source/detector packages with other components, including optical fibers.

In alternative embodiments, the optical communications system includes a power splitting arrangement comprising an optical signal launching device such as a single or multi-element optical source, a plurality of receiving devices such as optical fibers, and a plurality of optical guiding elements coupled between the launching device and the plurality of optical receiving devices. The power splitting arrangement couples the launching device to, e.g., the first ends of the optical guiding elements and couples the plurality of receiving devices to, e.g., the second ends of the plurality of optical guiding elements. In this manner, the optical information launched from the launching device is split into a plurality of signals for transmission through the optical guiding elements and on to, e.g., the receiving devices.

In another alternative embodiment, the optical communications system includes a multiplexing arrangement comprising a plurality of optical guiding elements coupled between an optical receiving device such as an optical fiber and a plurality of optical signal launching devices such optical sources. The multiplexing arrangement couples the receiving device to, e.g., the first ends of the optical guiding elements and couples the plurality of launching devices to, e.g., the second ends of the plurality of optical guiding elements. In this manner, the optical signals passing (e.g., at different wavelengths) from the plurality of launching optical sources are multiplexed into a composite optical signal that subsequently is coupled to the receiving device via the first ends of the optical guiding elements. The multiplexed optical signal is received by the receiving device.

DETAILED DESCRIPTION

In the following description, like reference numerals indicate like components to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Embodiments of the invention are based on the advantageous realization that optical signals or optical beams are steered or redirected using one or more optical guiding element having appropriate configurations. More specifically, embodiments of the invention use one or more optical guiding elements to redirect optical signals in a manner that results in the optical signals being laterally shifted or laterally displaced. Such shifting is advantageous, e.g., in arrangements within optical communications systems in which an optical beam transmitted from one or more launching devices is redirected to align with various components within the system, including one or more optical receiving devices such as optical fibers.

For purposes of discussion in this description, the terms "shifting" or "laterally displacing" when referring to an optical beam is understood to mean redirecting an optical beam entering a first end of the optical guiding element substantially along the transmission axis of the optical guiding element and then redirecting the optical beam out of a second, opposing end of the optical guiding element. For example, as will be discussed in greater detail hereinbelow, for an optical guiding element whose first and second ends redirect optical beams at an angle of approximately 90 degrees, an optical beam is laterally displaced in such a manner that the resulting axis of transmission of the optical beam is substantially parallel to the original axis of transmission of the optical beam.

Figure 1A:
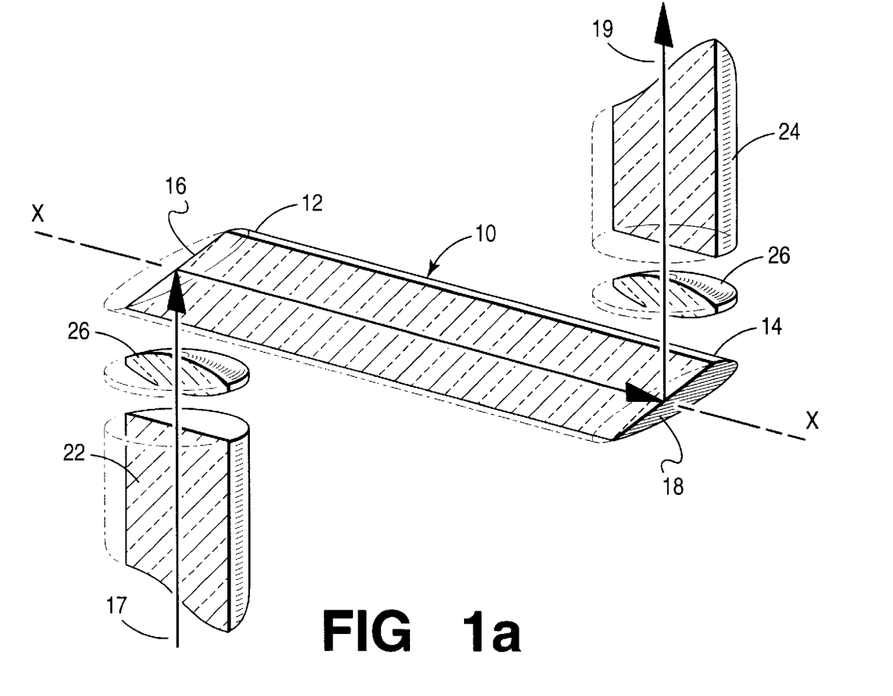
FIG. 1a is a schematic, cross-sectional view of an optical guiding element according to an embodiment of the invention.
Figure 1B:
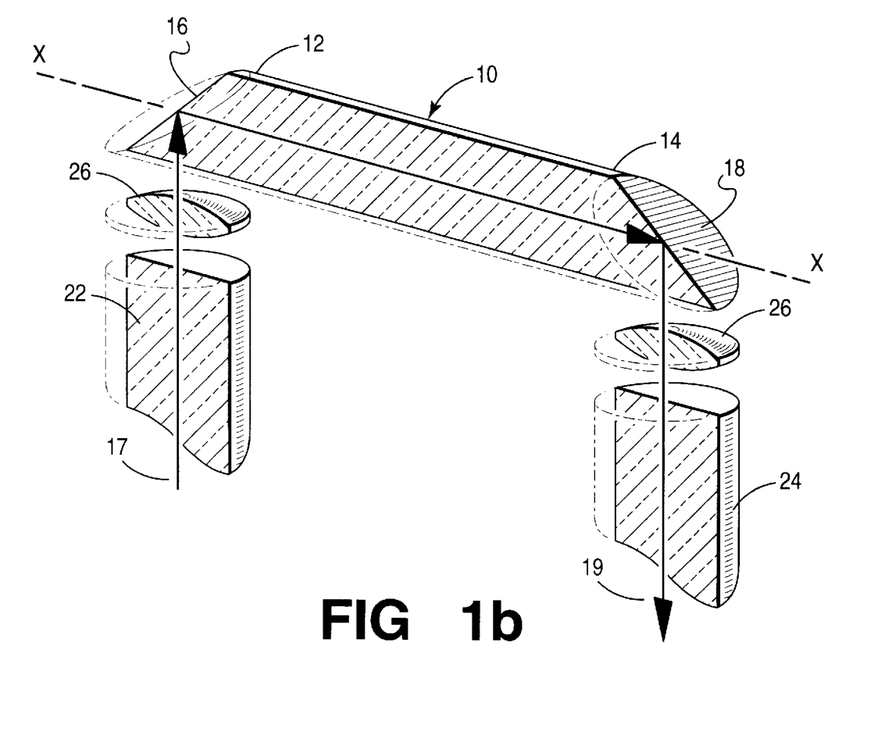
FIG. 1b is a schematic, cross-sectional view of an optical guiding element according to an alternative embodiment of the invention.

Referring now to FIGS. 1a and 1b, a schematic, cross-sectional view of an optical guiding element 10 according to various embodiments of the invention is shown. The optical guiding element 10 is, e.g., a rod-shaped optical transmission medium made of, e.g., glass, plastic such as molded plastic or other suitable material or materials that adequately transmit optical signals. Such materials include, e.g., polymethymethacrylate (pmma), polymethylpentene and other acrylics.

In keeping with fundamental principles of lightwave transmission, the index of refraction of the optical guiding element 10 should be greater than the index of refraction of its surrounding medium, which typically is air (index of refraction=1.0). Alternatively, the optical guiding element 10 is surrounded, at least partially, by a cladding layer having an index of refraction less than the index of refraction of the optical guiding element 10.

The optical guiding element 10 includes a first end 12, a second end 14 (e.g., opposing the first end 12), and an axis of transmission (shown generally as the x axis) running longitudinally therebetween. According to embodiments of the invention, the optical guiding element 10 is configured with end geometries that generally reflect or redirect incoming optical signals along the axis of transmission of the optical guiding element. Also, the end geometries of the optical guiding element 10 generally reflect or redirect optical signals traveling generally along the axis of transmission of the optical guiding element 10 out of the optical guiding element 10 at an appropriate angle.

For example, the first end 12 includes an angled face 16 or other means for reflecting incoming optical beams (shown generally as 17) transmitted from an optical launching device 22 generally along the axis of transmission of the optical guiding element 10. Typical launching devices 22 include, e.g., optical sources or other optical transmitting devices such as lasers and light emitting diodes (LEDs), and other suitable devices such as optical fiber that carry optical signals. The angled face 16 is, e.g., a highly reflective surface with an angle of approximately 45 degrees. Alternatively, the angled face 16 includes a reflective coating formed thereon.

Similarly, the second end 14 includes an angled face 18 for reflecting optical beams generally transmitted along the axis of transmission of the optical guiding element 10 out of the second end 14 toward an optical signal receiving element or device 24 (the redirected outgoing beam is shown generally as 19). Typical receiving devices 24 include, e.g., an optical or opto-electronic detector such as semiconductor photodiodes, photodetectors or other suitable receiving elements such as optical fibers and optical connectors. In this manner, optical beams traveling in a first direction and entering the first end 12 of the optical guiding element 10 are redirected, e.g., by the angled face 16, generally along the axis of transmission of the optical guiding element 10. Such optical beams are redirected, e.g., by the angled face 18, out of the second end 14 of the optical guiding element 10 in a second direction, which is laterally displaced from the first direction.

The orientation of the angled faces 16, 18 with respect to one another determines the general direction of reflection of optical signals passing through the optical guiding element 10. For example, as shown in FIG. 1a, with angled faces 16, 18 generally parallel with respect to one another and angled at approximately 45 degrees with respect to the axis of transmission of the optical guiding element 10, optical signals entering and exiting the optical guiding element 10 are laterally displaced from one another but generally travel in the same direction. However, as shown in FIG. 1b, with angled faces 16, 18 generally complementary with respect to one another and having faces angled at approximately 45 degrees, optical signals entering and exiting the optical guiding element 10 are laterally displaced from one another but generally travel in opposite directions.

Also, depending on the respective angles of the angled faces 16, 18 and the orientation of one with respect to the other about the axis of transmission of the optical guiding element 10, any number of redirection combinations is possible according to embodiments of the invention. For example, with both angled faces 16, 18 having faces angled at approximately 45 degrees with respect to the longitudinal axis of the optical guiding element 10, the angled face 18 at the second end 14 of the optical guiding element 10 may be oriented (rotationally about the longitudinal axis of the optical guiding element 10) with respect to the angled face 16 at the first end 12 of the optical guiding element 10 to redirect optical signals passing through the optical guiding element 10 in a direction generally orthogonal to an incoming optical signal 17.

Furthermore, the difference between the angles of the angled faces 16, 18 also determines the redirection of optical signals passing through the optical guiding element 10. For example, according to embodiments of the invention, both angled faces 16, 18 shown in FIGS. 1a and 1b are angled at approximately 45 degrees with respect to longitudinal axis of the optical guiding element 10 (and with respect to the angle of incidence of the incoming optical beam 17). Thus, the incoming optical beams 17 launched in a first direction enter the first end 12 of the optical guiding element 10, are redirected approximately 90 degrees by the angled face 16 generally along the transmission axis of the optical guiding element 10, and are again redirected approximately 90 degrees by the angled face 18 out of the optical guiding element 10 in a second direction, which is laterally displaced from but substantially parallel to the first direction. Accordingly, the direction of the outgoing optical beams 19 redirected out of the optical guiding element 10 generally is parallel to the direction of the incoming optical signals 17. However, it should be remembered that for optical guiding elements with angled faces less than or more than approximately 45 degrees, less redirected light passes through the optical guiding element 10 from the first end 12 to the second end 14 and thus less redirected light is coupled from, e.g., the launching device 22 to the receiving device 24.

Figure 1C:
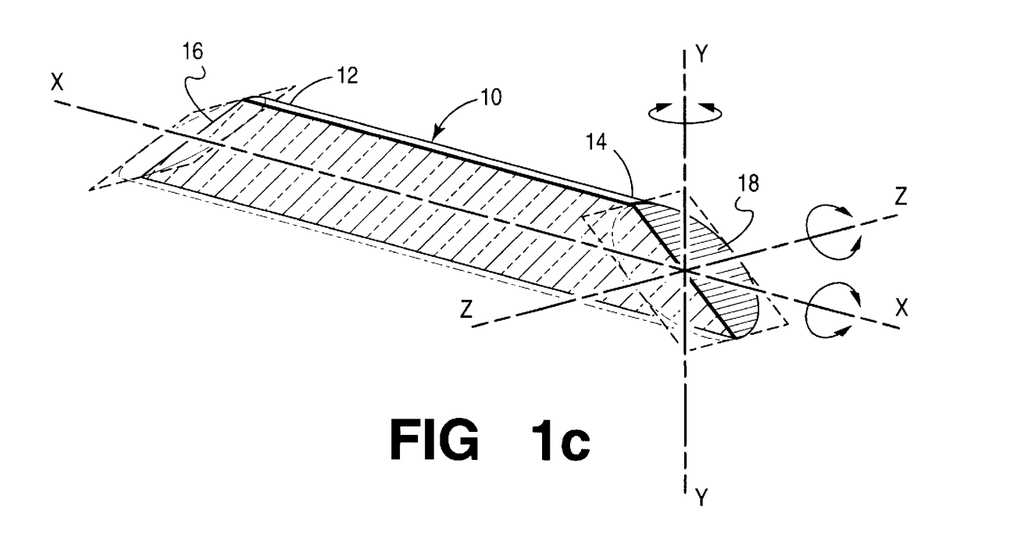
FIG. 1c is a schematic, cross-sectional view of an optical guiding element according to embodiments of the invention.

Furthermore, it should be understood that, according to embodiments of the invention, it is possible for one or both of the first and second angled faces 16, 18 to be formed at any desired angle with respect to the axis of transmission of the optical guiding element 10 to redirect incoming and/or outgoing optical beams in any corresponding direction. For example, as shown in FIG. 1c, the plane formed by the second angled face 18 has been rotated slightly about the z-axis. However, according to embodiments of the invention, it is possible to rotate the plane formed by the second angled face 18 about the x-axis and/or y-axis and/or z-axis, depending on the desired redirection of optical beams.

Although the first and second ends of the optical guiding elements 10 operate in a similar manner with respect to redirecting optical signals and reference to their being "first" and "second" ends is arbitrary, an attempt is made herein to maintain consistency with respect to these references for purposes of enhancing the clarity of the discussion. Also, although the optical guiding elements discussed herein and shown in the figures mostly have a rod-like shape, it is possible for the optical guiding element to be configured as needed to achieve the desired beam displacement. For example, it is possible for the optical guiding element 10 to be oval or rectangular, with a cross-section either round, oval or generally square.

According to alternative embodiments of the invention, the first end 12 and/or second end 14 of the optical guiding element 10 includes a lens 26 or lens combination coupled thereto, as shown. The lenses 26 are, e.g., refractive lenses (as shown generally) or, alternatively, are diffractive (not shown). The lenses 26 are shaped appropriately and coupled to the first end 12 to enhance the collection of optical beams entering optical guiding element 10 and/or coupled to the second end 14 to enhance the dispersion of optical beams exiting optical guiding element 10. The lenses 26 are shaped and coupled to the respective ends of the optical guiding element 10, e.g., in a conventional manner.

In operation, the optical guiding element 10 is coupled with respect to the launching device 22 and the receiving element 24, e.g., as shown in FIG. 1. The optical guiding element 10 is aligned and oriented with respect to the launching device 22 in such a way that the launched optical signals enter the first end 12 of the optical guiding element 10 for redirection generally along the axis of transmission of the optical guiding element 10. Similarly, the receiving element 24 is aligned and oriented with respect to the optical guiding element 10 in general and the second end 14 in particular in such a way that the outgoing optical signals are directed sufficiently at the receiving element 24 for appropriate reception thereof, e.g., in a conventional manner.

Figure 2:
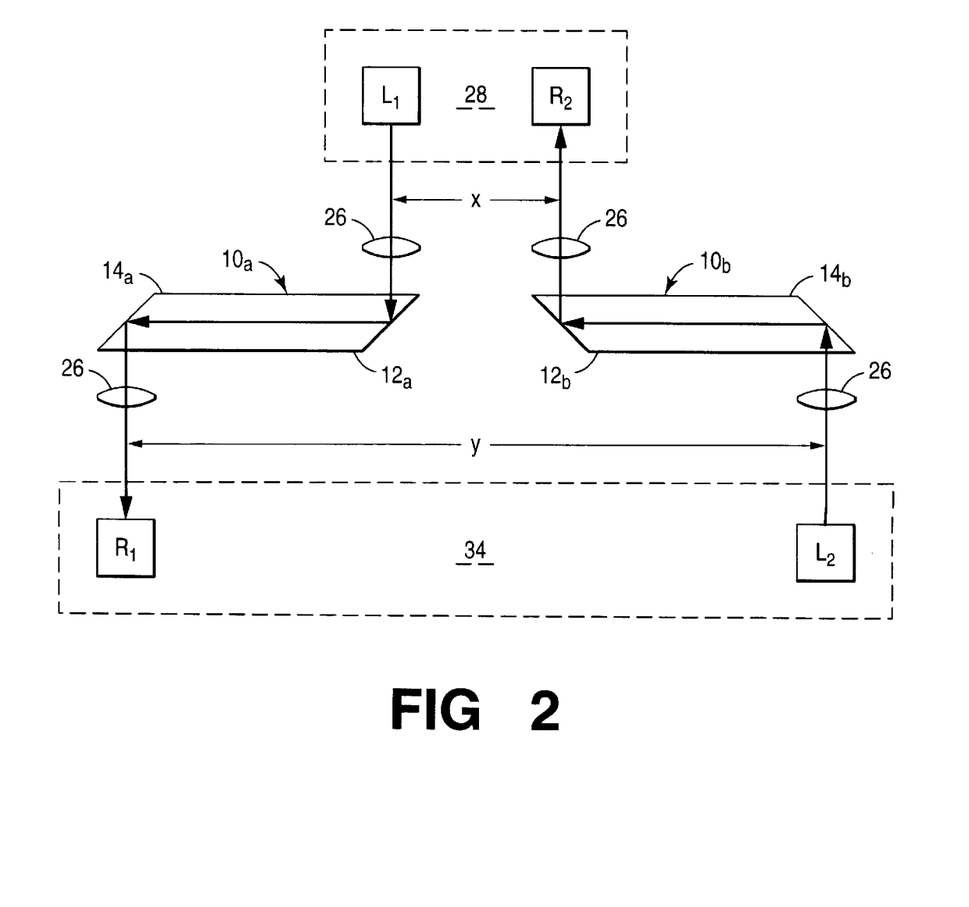
FIG. 2 is a schematic, cross-sectional view of a pair of optical guiding elements according to other embodiments of the invention.

Referring now to FIG. 2, a schematic, cross-sectional view of a pair of optical guiding elements $10_a$, $10_b$ according to another embodiment of the invention is shown. In this embodiment, a pair of optical guiding elements are used to laterally displace the transmission axes of an optical beam from a first launching device $L_1$ to a first receiving element $R_1$ and an optical beam to a second receiving element $R_2$ from a second launching device $L_2$. Such embodiments are advantageous, e.g., when coupling a source/detector package (shown generally as 28) to other component(s) not dimensioned as such. That is, many conventional optical launching and optical receiving devices are packaged in off-the-shelf packages having separation between launching devices and receiving devices of approximately 100 to 1000 microns ($\mu$m) center to center (e.g., shown generally as the distance x shown in FIG. 2). However, many elements including connectors used to interconnect optical components within optical communications systems have waveguides spaced apart on the order of, e.g., 5 millimeters (mm) (e.g., shown generally as the distance y in FIG. 2).

In such arrangements, embodiments of the invention include a first optical guiding element $10_a$ having a first end $12_a$ coupled to the first launching device $L_1$ and a second end $14_a$ coupled to the corresponding first receiving element $R_1$. Also, a second optical guiding element $10_b$ having a second end $14_b$ coupled to the second launching device $L_2$ and a first end $12_b$ coupled to the second receiving element $R_2$. According to an embodiment of the invention, the first and second optical guiding elements $10_a$, $10_b$ are positioned, e.g., as shown. In this arrangement, the distance (y) between the redirected optical signals at the second ends $14_a$, $14_b$ of the optical guiding elements $10_a$, $10_b$ is much greater than the distance between the transmission axes (x) of the first launching device $L_1$ and the second receiving element $R_2$. In this manner, the transmission axis of the optical beams launched by the first launching device $L_1$ and the transmission axis of the optical beams received by the second receiving element $R_2$ have been laterally displaced.

The amount of lateral displacement depends on the length of the first and second optical guiding elements $10_a$, $10_b$. For example, according to an embodiment of the invention, the first and second optical guiding elements $10_a$, $10_b$ are dimensioned such that the combined lateral displacement (y) of redirected optical signals at the second ends $14_a$, $14_b$ of the optical guiding elements $10_a$, $10_b$ aligns appropriately with waveguides of an optical connector. More specifically, in the context of FIG. 2, as shown, the first receiving element $R_1$ and the second launching device $L_2$ would be, e.g., waveguides formed in an optical connector 34, and the combined lateral displacement (y) of redirected optical signals at the second ends $14_a$, $14_b$ of the optical guiding elements $10_a$, $10_b$ is such that the redirected optical signals align appropriately therewith.

Figure 3:
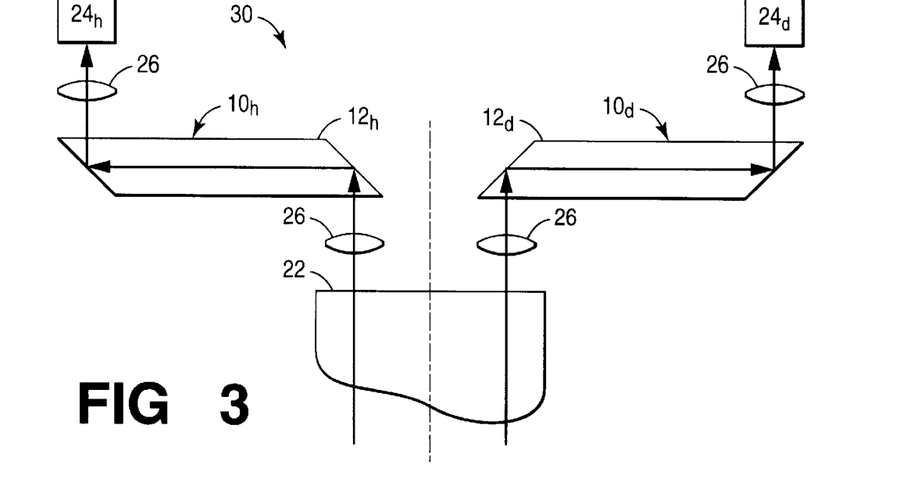
FIG. 3 is a schematic, cross-sectional view of a power splitting arrangement using a plurality of optical guiding elements according to embodiments of the invention.
Figure 4A:
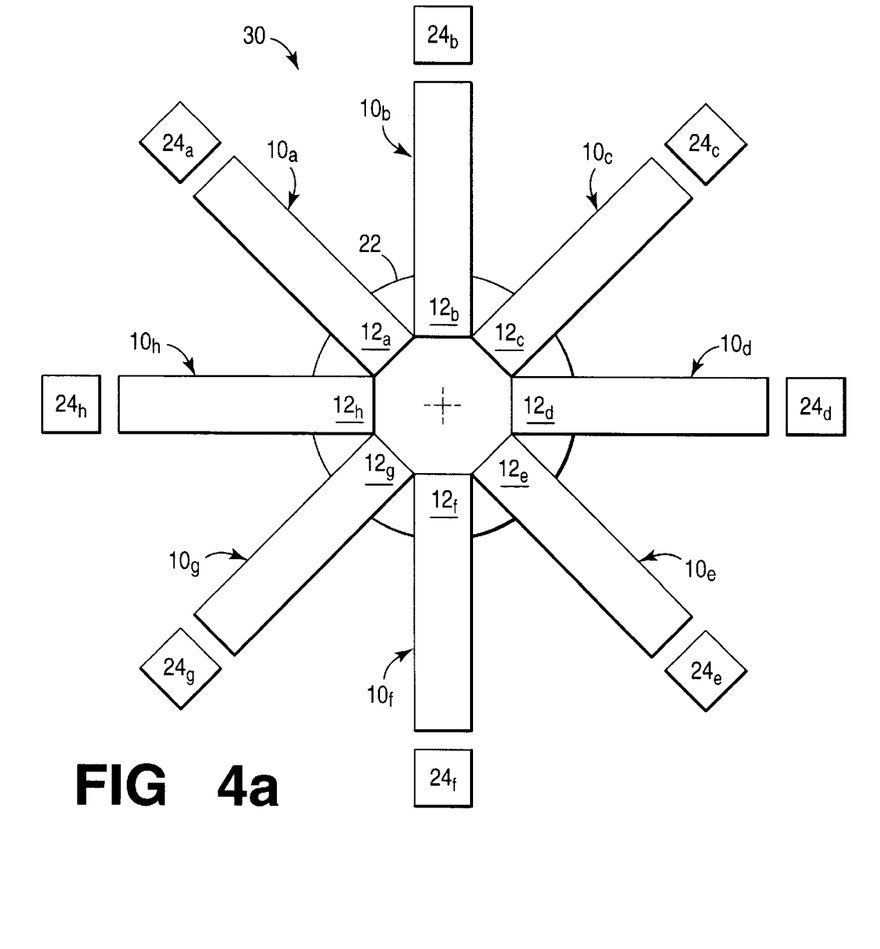
FIG. 4a is a schematic, cross-sectional views of the power splitting arrangement of FIG. 3, taken along the lines 4—4 of FIG. 3.
Figure 4B:
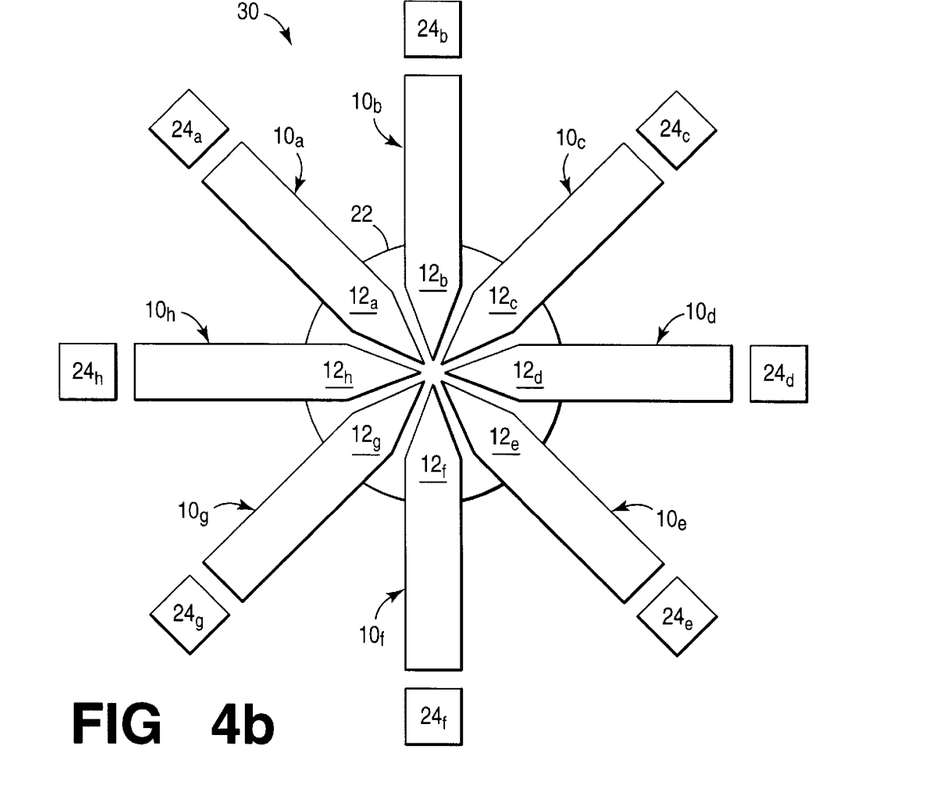
FIG. 4b is a schematic, cross-sectional views of a power splitting arrangement according to an alternative embodiment of the invention.

Referring now to FIGS. 3–4, a power splitting arrangement 30 using a plurality of optical guiding elements $10_a$–$10_h$ according to embodiments of the invention is shown schematically in cross-section (FIG. 3) and generally from above (FIGS. 4a–b). In this embodiment, the first end 12 of a plurality of optical guiding elements $10_a$–$10_h$ are coupled to a launching device 22 and the second end of the plurality of optical guiding elements $10_a$–$10_h$ are coupled to a corresponding plurality of receiving elements $24_a$–$24_h$ or other suitable components. In this manner, optical signals transmitted from the launching device 22 are split among the plurality of optical guiding elements for passage through to the corresponding plurality of receiving devices $24_a$–$24_h$. The particular coupling arrangement between the launching device 22 and the plurality of receiving devices $24_a$–$24_h$ depends on, e.g., the number of optical guiding elements to be coupled to the launching device 22, the relative size and shape of the optical guiding elements $10_a$–$10_h$ compared to that of the launching device 22, and the coupling position of the optical guiding elements $10_a$–$10_h$ with respect to the launching device 22.

For example, if the width of the optical guiding elements $10_a$–$10_h$ are relatively small compared to, e.g., the diameter of the launching device 22, then the plurality of optical guiding elements $10_a$–$10_h$ might be coupled to the optical source as shown in FIG. 4a. However, if the optical guiding elements $10_a$–$10_h$ are slightly larger, the first ends thereof might be wedge-shaped so that a sufficient number of optical guiding elements are adequately coupled to the optical source. Such arrangement is shown, e.g., in FIG. 4b.

Although the plurality of optical guiding elements $10_a$–$10_h$ are shown as being independent elements, it should be remembered that, according to alternative embodiments of the invention, the plurality of optical guiding elements $10_a$–$10_h$ are, e.g., molded, or otherwise formed from the same structure. In this manner, for example, the edges of optical guiding elements would be connected slightly. Also, other suitable connection arrangements are within the scope of those skilled in the art.

Figure 5:
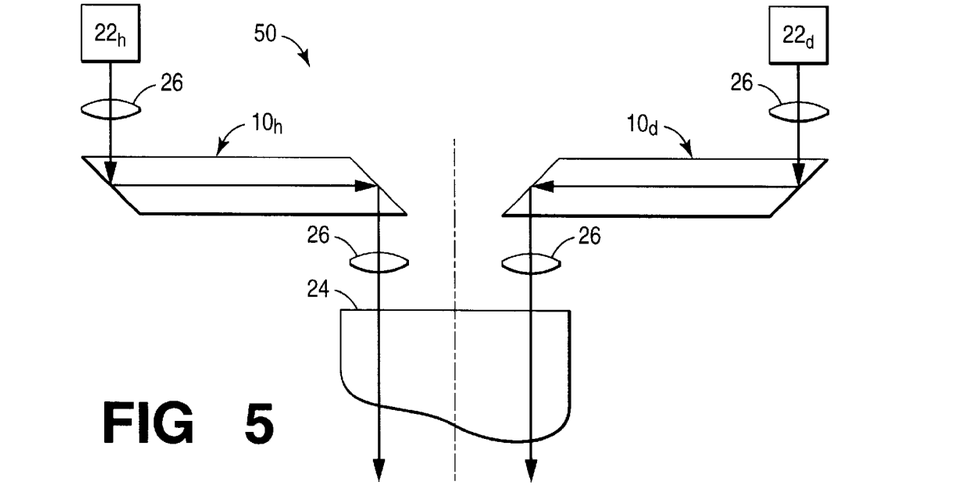
FIG. 5 is a schematic, cross-sectional view of a multiplexing arrangement using a plurality of optical guiding elements according to embodiments of the invention.
Figure 6:
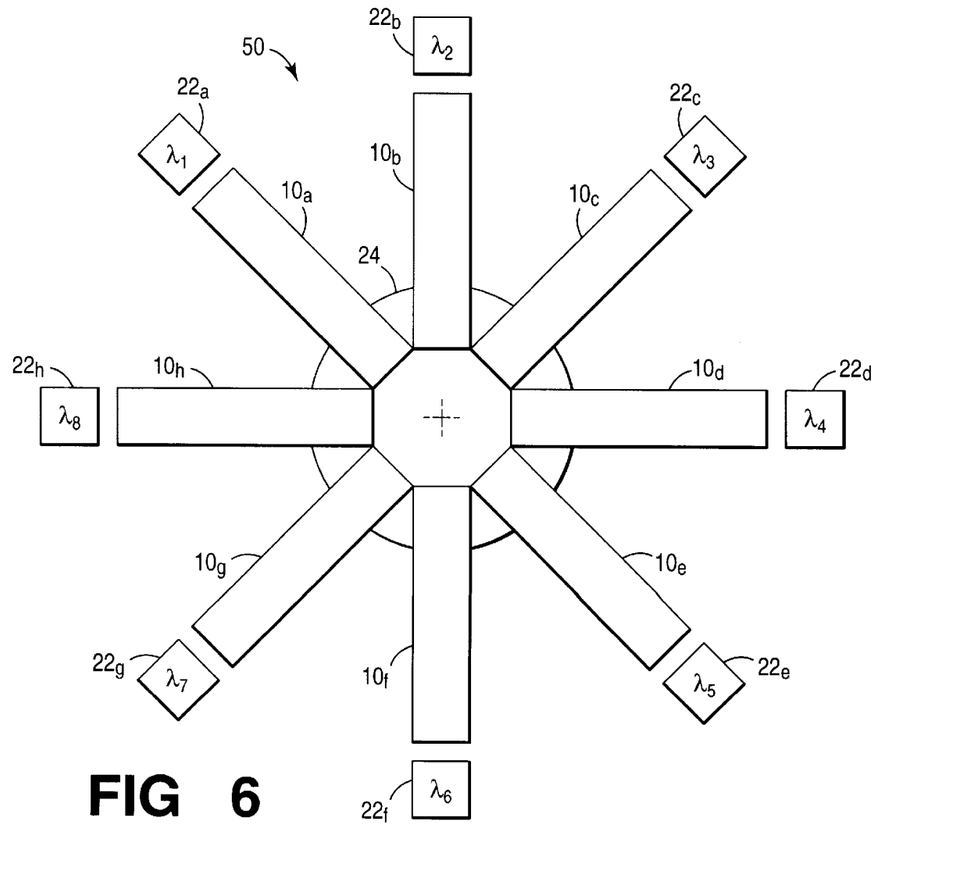
FIG. 6 is a schematic, cross-sectional view of the multiplexing arrangement of FIG. 3, taken along the lines 6—6 of FIG. 3.

Referring now to FIGS. 5–6, a multiplexing arrangement 50 using a plurality of optical guiding elements according to embodiments of the invention is shown schematically in cross-section (FIG. 5) and from a top view (FIG. 6). In this arrangement, a plurality of optical guiding elements $10_a$–$10_h$ couple a corresponding plurality of optical launching devices $22_a$–$22_h$ to an optical receiving element 24. The optical guiding elements $10_a$–$10_h$ multiplex or multiplexingly couple optical signals transmitted from the plurality of launching devices $22_a$–$22_h$ to the optical receiving element 24.

Such arrangement is possible, e.g., when the plurality of launching devices $22_a$–$22_h$ transmit optical signals at different frequencies or wavelengths. The terms "frequency" (f) and "wavelength" ($\lambda$) are used interchangeably herein and are inversely related as follows: $f=c/\lambda$, where c is the speed of light in a vacuum (i.e., $3\times10^8$ meters/second). For example, as shown in FIGS. 5–6, the plurality of launching devices 22 are shown generally as transmitting optical signals at different wavelengths ($\lambda_1, \lambda_2, \ldots, \lambda_8$). The optical guiding elements $10_a$–$10_h$, e.g., corresponding to the plurality of launching devices $22_a$–$22_h$, are sufficiently coupled to the optical receiving devices 24 such that the optical signals are multiplexingly combined and coupled to the optical receiving devices 24.

Figure 7:
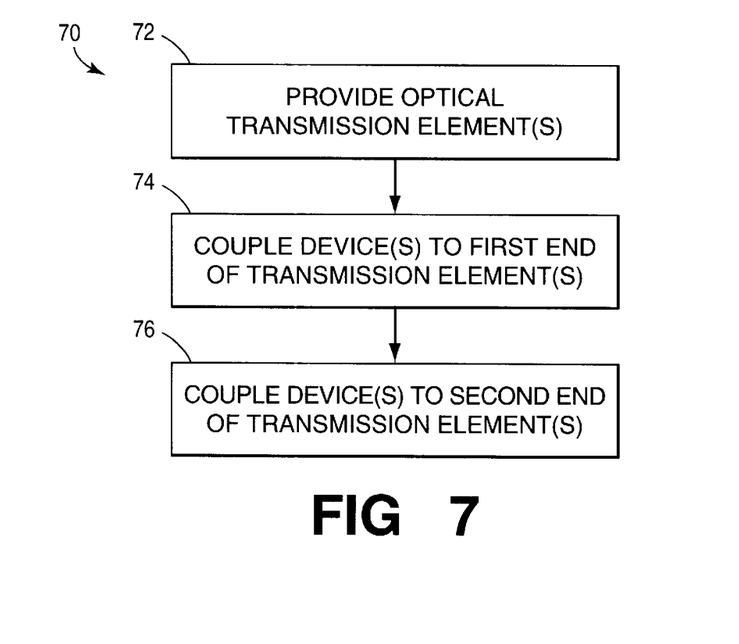
FIG. 7 is a simplified block diagram of a method for laterally displacing optical signals according to embodiments of the invention.

Referring now to FIG. 7, with continuing reference to FIGS. 1–6, a simplified block diagram of a method 70 for laterally displacing optical signals according to embodiments of the invention is shown. According to embodiments of the invention, the method 70 includes a step 72 of providing at least one optical guiding element for laterally displacing optical signals. As discussed previously herein, the optical guiding element is a suitably shaped optically transmissive device with end geometries configured to redirect light entering a first end along the transmission axis of the optical guiding element and to redirect light passing along the transmission axis thereof out of the other end. This lateral displacement of optical information is useful in applications where beam steering is desired, e.g., in optical communications systems whose optical launching and/or receiving elements are not conveniently positioned with respect to each other or with respect to other components in the system.

According to embodiments of the invention, the method 70 includes a next step 74 of coupling one or more devices or elements to the first end of one or more optical guiding elements. As discussed previously herein, depending on the particular application, the device(s) or element(s) coupled to the first end(s) of the optical guiding element(s) is, e.g., an optical launching device such as an optical source, an optical fiber, an optical receiving device such as an optical detector, or an optical connector. For example, in the embodiments of the invention shown in FIGS. 1–4, an optical launching device 22 is coupled to the first end 12 of the optical guiding element 10. However, in the multiplexer arrangement 50 shown in FIGS. 5–6, an optical receiving device 24 is coupled to the first end 12 of the optical guiding element 10.

Also, depending on the particular application, the coupling step 74 includes coupling more than one element or device to the first end of more than one optical guiding element. For example, in embodiments of the invention shown in FIG. 1, a single device (launching device 22) is coupled to the first end 12 of a single optical guiding element 10. However, in embodiments of the invention shown in FIGS. 2–6, a single device is coupled to the first end of more than one optical guiding element.

According to embodiments of the invention, the method 70 includes another step 76 of coupling one or more elements or devices to the second end of one or more optical guiding elements. As discussed previously herein, the particular embodiment or application often determines whether the coupled device or devices is an optical launching device (e.g., an optical source), an optical receiving device or an optical connecting element or device. For example, in the embodiments shown in FIGS. 1 and 3–4, an optical receiving element 24 is coupled to the second end 14 of the optical guiding element 10. However, in the multiplexer arrangement 50 shown in FIGS. 5–6, a launching device 22 device is coupled to the second end of the optical guiding element 10. Moreover, in the embodiment shown in FIG. 2, an optical connector 34 is coupled to the second ends of the optical guiding elements.

Also, depending on the particular application, the second coupling step 76 includes coupling one or more than one element or device to the second end of one or more than one optical guiding element. For example, in embodiments of the invention shown in FIG. 1, a single device (receiving element 24) is coupled to the second end 14 of an optical guiding element 10. However, in embodiments of the invention shown in FIGS. 2–6, a single element (e.g., an optical connector in FIG. 2, an optical receiving element in FIGS. 3–4 and an optical launching device in FIGS. 5–6) is coupled to the second end of more than one optical guiding element.

It will be apparent to those skilled in the art that many changes and substitutions can be made to the embodiments of the beam steering systems, apparatus and methods herein described without departing from the spirit and scope of the invention as defined by the appended claims and their full scope of equivalents.

What is claimed is:

1. A system for transmitting optical signals, comprising:
    a first launching device for launching an optical signal in a first direction;
    a first receiving device for receiving an optical signal in a second direction laterally displaced from the first direction,
    the first launching device having a transmission axis and being part of a device package that includes a second receiving device having a transmission axis and oriented in such a way that the transmission axis of the launching device and the transmission axis of the second receiving device are separated by a distance x;
    a first optical guiding element having a first end coupled to the first launching device and a second end coupled to the first receiving device; and
    a second optical guiding element having a first end coupled to the first receiving device and a second end coupled to a second launching device,
    wherein the first ends of the first and second optical guiding elements are coupled to the first launching device and the second receiving device, respectively, in such a way that the first and second optical guiding elements are substantially coaxial, whereby the transmission axis of an optical signal redirected out the second end of the first optical guiding element and the transmission axis of an optical signal directed into the second end of the second optical guiding element for receiving by the first receiving device at the first end thereof are separated by a distance y greater than x.

2. The system as recited in claim 1, further comprising at least one connector for coupling the first optical guiding element to the first receiving device and for coupling the second launching device to the second optical guiding element, wherein the at least one connector includes first and second waveguides spaced apart approximately by the distance y for coupling to the second ends of the first and second optical guiding elements.

3. The system as recited in claim 1, wherein the system further comprises:
    a plurality of optical guiding elements coupled at their first ends to the launching device in such a way that light propagating in a first direction from the launching device is split among more than one of the plurality of optical guiding elements and redirected along their respective transmission axes; and
    a corresponding plurality of receiving devices coupled to the second ends of the plurality of optical guiding elements.

4. The system as recited in claim 1, wherein the system further comprises:
    a plurality of N launching devices capable of transmitting a corresponding plurality of N optical signals, wherein the N optical signals are transmitted at different frequencies;
    a plurality of optical guiding elements corresponding to the plurality of N launching devices and coupled at their first ends to the N launching devices, wherein the N optical signals are multiplexingly redirected out of the second ends of the plurality of optical guiding elements in such a way that at least a portion of the N optical signals are detected by the receiving device.

5. The system as recited in claim 1, wherein at least one of the first and second ends of the optical guiding element includes a facet angled in such a way as to redirect an optical signal approximately 90 degrees.

6. The system as recited in claim 5, at least one of the facets is coated with a reflective material.

7. The system as recited in claim 1, wherein at least one of the first and second ends includes a substantially reflective facet that lies substantially in a plane having an angle of approximately 45 degrees with respect to the transmission axis of the optical guiding element.

8. The system as recited in claim 1, wherein at least one of the first and second ends has an angled face, wherein the optical guiding element includes at least one lens coupled to at least one of the first and second ends at a location across from the respective angled face, and wherein the angled face and coupled lens redirect light propagating therethrough along the transmission axis.

9. The system as recited in claim 1, wherein the index of refraction of the optical guiding element is greater than 1.0.

10. A method for redirecting optical signals, comprising the steps of:
    providing a first optical guiding element having a first end, a second end and a transmission axis therebetween, and a second optical guiding element having a first end, a second end and a transmission axis therebetween, wherein the first and second ends are configured to redirect optical signals substantially along the transmission axis of the respective optical guiding element;
    providing a device package having an optical signal launching element and an optical signal receiving element;
    coupling the first end of the first optical guiding element to the optical signal launching element in such a way that at least a portion of the optical information launched from the optical signal launching element in a first direction enters the first end of the first optical guiding element and is redirected substantially along the transmission axis thereof to the second end and redirected out of the second end in a second direction that is laterally displaced from the first direction; and
    coupling the first end of the second optical guiding element to the optical signal receiving element in such a way that at least a portion of optical information entering the second end of the second optical guiding element in a third direction is redirected substantially along the transmission axis thereof to the first end and redirected in a second direction into the optical signal receiving element in a fourth direction that is laterally displaced from the third direction.

11. The method as recited in claim 10, wherein the optical signal launching element has an axis of transmission and is oriented with respect to the optical guiding element in such a way that the transmission axis of the optical signal launching element is substantially perpendicular to the transmission axis of the optical guiding element and substantially in the first direction.

12. The method as recited in claim 10, further comprising the step of coupling an optical signal receiving element to the second end of the optical guiding element in such a way that at least a portion of the optical information passing through the optical guiding element is coupled to the optical signal receiving element.

13. The method as recited in claim 12, wherein the optical signal receiving element has an axis of transmission and is oriented with respect to the optical guiding element in such a way that the transmission axis of the optical signal receiving element is substantially perpendicular to the transmission axis of the optical guiding element and substantially in the second direction.

14. The method as recited in claim 10, further comprising the step of coupling an optical connector to the first and second optical guiding elements in such a way that at least a portion of the optical information redirected out of the second ends of the first and second optical guiding elements is coupled to the optical connector.

15. The method as recited in claim 10, wherein the optical signal launching element further comprises a first optical signal launching element, and wherein the method further comprises the steps of:

coupling a second receiving element to the second end of the first optical guiding element in such a way that at least a portion of the optical information redirected out of the second end of the first optical guiding elements is coupled to the second receiving element; and coupling a second optical signal launching element to the second end of the second optical guiding element in such a way that at least a portion of the optical information launched into the second end of the second optical guiding element is redirected out of the first end of the second optical guiding element and coupled to the first receiving element.

16. The method as recited in claim 10, wherein the at least one optical guiding element further comprises a plurality of optical guiding elements, and wherein the method further comprises the steps of:

coupling the optical guiding elements at their first ends to the optical signal launching element in such a way that light propagating in a first direction from the optical signal launching element is split among more than one of the plurality of optical guiding elements and redirected along their respective transmission axes; and coupling to the second ends of the plurality of optical guiding elements a corresponding plurality of optical signal receiving elements in such a way that at least a portion of the optical information passing through the optical guiding elements is coupled to at least a portion of the optical signal receiving elements.

17. The method as recited in claim 10, wherein the at least one optical guiding element further comprises a plurality of optical guiding elements, and wherein the method further comprises the steps of:

coupling the optical guiding elements at their first ends to a plurality of N optical signal launching elements capable of launching N optical signals, wherein the N optical signals are launched at frequencies different from one another; and coupling the optical guiding elements at their second ends to an optical signal receiving element wherein at least a portion of the N optical signals transmitted through the optical guiding elements are multiplexingly redirected out of the second ends of the plurality of optical guiding elements in such a way that at least a portion of the N optical signals are multiplexingly received by at least a portion of the optical signal receiving elements.

\* \* \* \* \*